March 3, 1936. H. A. BLANCHARD ET AL 2,032,735
VARIABLE SPEED MECHANISM
Filed Dec. 11, 1931 2 Sheets-Sheet 1

INVENTORS
Hymen A. Blanchard
Charles W. Robertson
BY Popp and Powers
ATTORNEYS

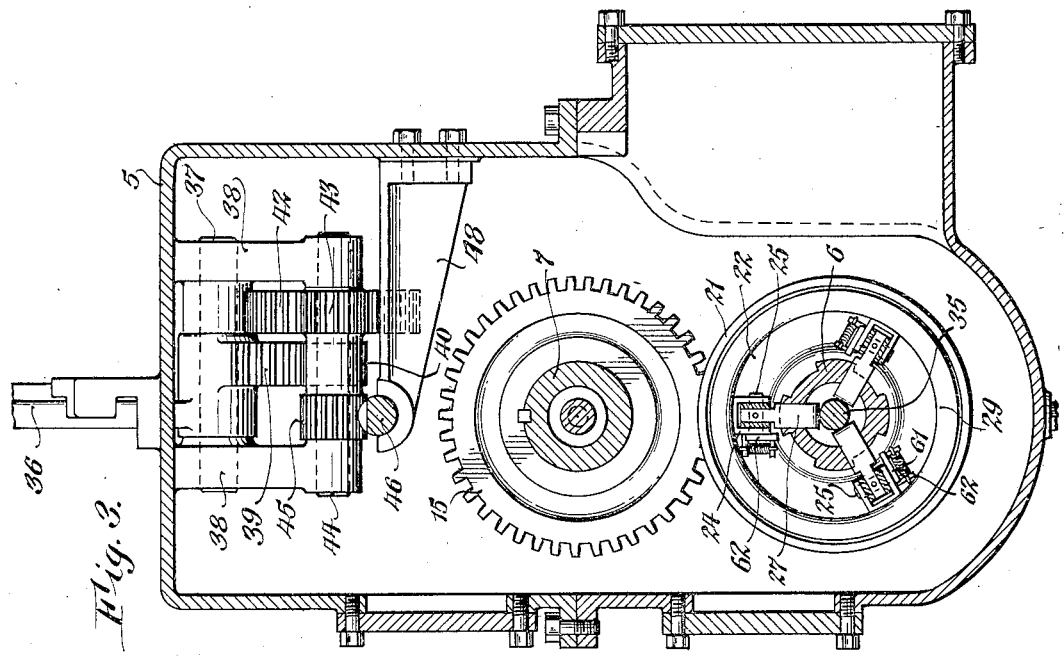

Patented Mar. 3, 1936

2,032,735

UNITED STATES PATENT OFFICE 2,032,735

VARIABLE SPEED MECHANISM

Hymen A. Blanchard and Charles W. Robertson, Buffalo, N. Y.; said Robertson assignor to said Blanchard Application December 11, 1931, Serial No. 580,368

8 Claims. (Cl. 74—358)

This invention relates to improvements in variable speed mechanisms of the kind in which the various sets of cooperating gears are permanently in mesh, such a construction being desirable in order to avoid the necessity of sliding the gears into mesh while revolving. In this type of mechanism, it is the practice to employ a driven shaft and a countershaft for carrying the various gears of the sets, one gear of each set being loosely mounted upon its shaft and cooperating with suitable clutch means, whereby power may be transmitted to the driven shaft through any one of the various sets of gears.

One object of the present invention is a novel construction and arrangement of the various sets of gears and associated clutches, whereby the sets of gears may be rendered operative in a predetermined sequence by the continuous movement in one direction of the control lever.

A further object is to provide a variable speed mechanism in which the clutches may be operated to obtain the result described either manually or by power.

A still further object is to provide a mechanism in which the driven shaft may be disconnected from the driving shaft, and hence from power, by a slight movement of the control means regardless of the particular clutch which may be engaged at the time.

The invention is illustrated in the accompanying drawings, in which:

Figure 2 is a vertical section taken along line 2—2 of Figure 1.

Figure 3 is a vertical section taken along line 3—3 of Figure 1.

Figure 1:
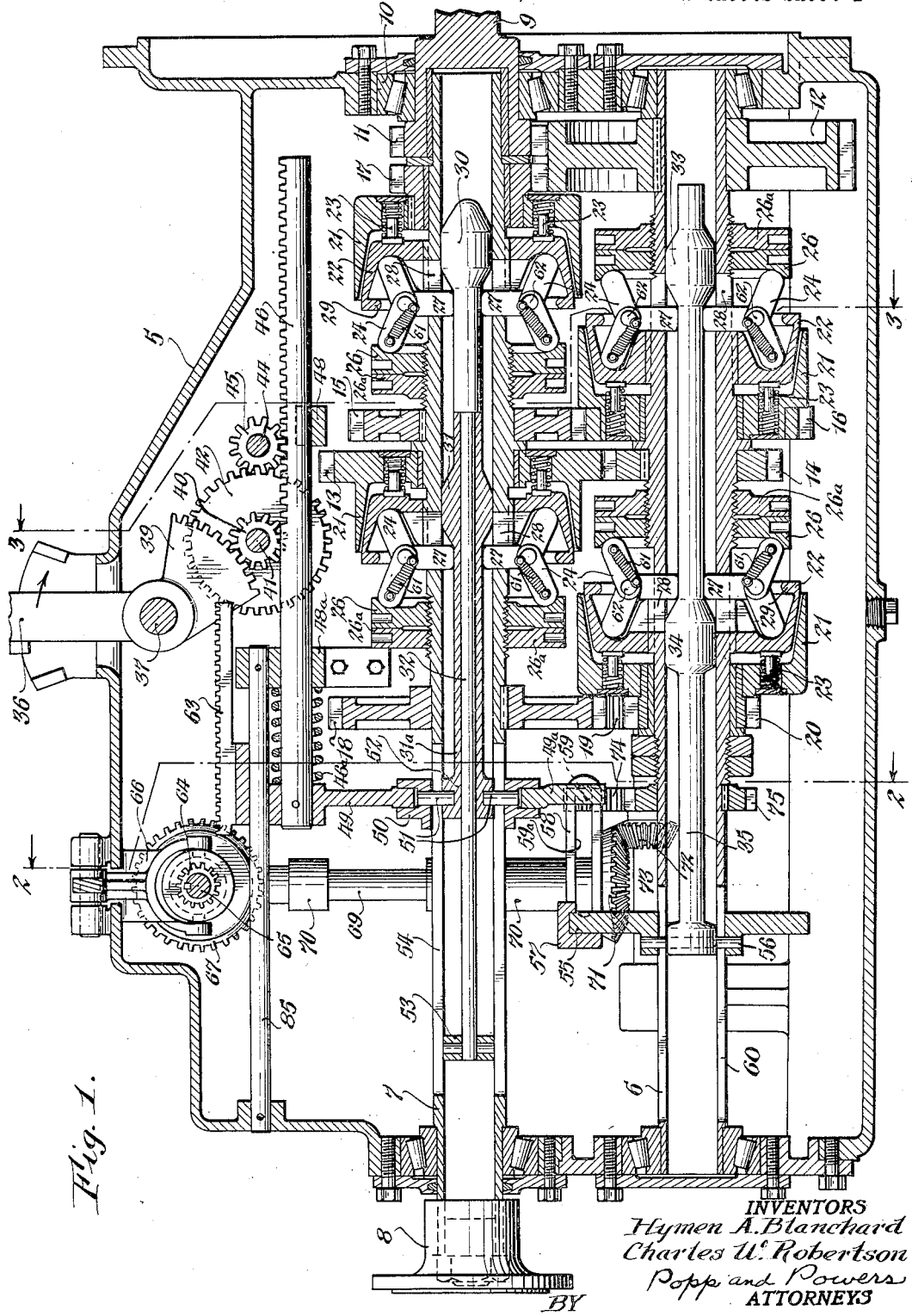
Figure 1 is a vertical section through a variable speed mechanism constructed in accordance with the invention.

The variable speed mechanism is available for use as an automobile transmission and in the description of the invention reference is made from time to time of its use in this connection. It is to be understood, however, that the invention is capable of other applications and any such reference is by way of example only.

The variable speed mechanism is mounted in a suitable casing 5. It includes a countershaft 6 and a driven shaft 7, said shafts being tubular in form and being arranged in parallel relation in the casing. One end of the shaft 7 is provided with a coupling 8 and the other end of the shaft is journalled in the hollow end of a stub or drive shaft 9, it being understood that in the illustrated embodiment the coupling 8 connects the driven shaft 7 to the device to which the power is to be transmitted while the stub shaft 9 is connected to the engine or other prime mover which provides the source of power. The stub shaft 9 is journalled in suitable bearings 10 and as it is loosely mounted on the shaft 7, it revolves freely upon the said shaft during the operation of the said engine or other prime mover.

The stub shaft 9 is formed or provided with a gear 11 which meshes with a gear 12 carried by the countershaft 6. The gear 12 is suitably keyed to the latter and hence as the stub shaft 9 revolves freely upon the driven shaft, it drives the shaft 6.

The embodiment illustrated is designed with reference to the requirements of an automobile transmission and the variable speed mechanism, therefore, includes four sets of gears which are adapted to provide three forward speeds and a reverse speed, in accordance with conventional practice. The various gears of the different sets are carried upon the driving and the driven shafts. Low, or first, speed is provided by gears 13 and 14, the former being freely mounted upon the driven shaft 7 and the latter being fixed to the countershaft 6. Intermediate, or second, speed is provided by gears 15 and 16, the former being suitably keyed to the driven shaft and the latter being loosely mounted upon the countershaft. High, or third, speed is provided by a gear 17 loosely mounted upon the driven shaft and the gear 12 which is fixed to the countershaft. Rotation of the driven shaft in a reverse direction is obtained by gears 18, 19 and 20, the first mentioned gear being fixed to the driven shaft and being connected to the last mentioned gear which is loosely mounted upon the countershaft by the gear 19.

It will be apparent from the foregoing that of each set of gears one of the gears is fixed to its shaft while the other gear of the set is loosely mounted upon its shaft. Hence, by securing the freely mounted gear in any one of the sets against angular movement relative to the shaft upon which it is mounted, the power which is delivered to the stub shaft 9 will be transmitted to the driven shaft 7, and hence the device with which the mechanism is associated, the speed of rotation of the shaft 7 depending, of course, upon the particular set of gears which is caused to operate in the manner described.

Means is provided whereby the loosely mounted gear in any one of the various sets of gears may be secured against angular movement relative to its shaft so that power may be transmitted through the desired set of gears. To this end, the loosely mounted gears, i. e. 13, 16, 17 and 20 are each secured to and carry a clutch member 21. The clutch member 21 co-operates with a companion clutch member 22 which is feathered to its respective shaft and hence is capable of movement into and out of co-operating relation with its companion clutch member while being held against angular movement relative to the shaft. The clutch members 22 are operable to engage the companion co-operating clutch members 21 and hence are adapted to secure the latter to the respective shafts in the manner described. The clutch members 21 and 22 are normally held out of engagement by headed spring loaded pins 23, the heads of which suitably engage the inner faces of the members 22 and permit relative angular movement between the clutch members when the latter are disengaged.

The clutch members 22 are moved into engagement with the companion clutch members 21 by toggle links 24, the links of each pair being connected by a pin 25. One of the links of each pair acts against a disc 26 and the other of the links acts against a clutch member 22. The pin 24 carries an arm 27, the free end of which extends through an elongated slot 28 formed in the particular shafts 6 and 7 for this purpose. It will be apparent that a clutch member 22 may be moved into co-operating relation with a companion clutch member by movement of the arm 27 in a direction in which the links must be moved to align them. The discs 26 are preferably adjustable in order that the desired manner of operation of the toggle links may be obtained, the said discs also being available for adjustment to compensate for wearing of the clutch parts. Locking discs 26a may be employed in connection with the discs 26 for securing the latter against accidental angular movement relative to the shafts. It will be noted that the clutch members 22 are formed with annular ribs 29 which while permitting operation of the toggle links to such an extent as to engage the clutch members prevent their movement to a point to or beyond dead center. This is for the purpose of insuring the return of the links 24 to an inoperative position by the spring loaded pins 27 when the clutch members are released.

With reference to the clutch members 22, it will be noted that the operating arms 27 of the toggle links extend through the slots 28 into the cylindrical chambers provided by the shafts 6 and 7. The clutch members 21 and 22 for the third speed set of gears, i. e. 17 and 12 are moved into co-operating relation by an enlargement or cam 30 which is carried by a rod 32, the said enlargement or cam urging the arms 27 outwardly as it moves between them, thereby tending to straighten the toggle links 24 and hence engaging the associated clutch members 21 and 22. The clutch members associated with the low speed set of gears, i. e. 13 and 14 are operated in a similar manner by an enlargement or cam 31, carried by a sleeve 31a. The latter fits over a portion of the rod 32 which carries the enlargement or cam 30. Hence, the enlargement 31 may be moved to operate the low, or first speed, clutch without movement of the enlargement 30 and hence without operation of the third speed clutch. The clutch members of the second and reverse speed sets of gears are keyed upon the countershaft 6. The clutch members of the second speed gears are operated in a similar manner to the first and third speed gear clutches by an enlargement or cam 33 while the clutch members of the reverse speed set of gears are similarly operated by an enlargement or cam 34. It will be noted that the enlargements 33 and 34 are formed or provided on a common rod 35 and that upon movement of the rod said enlargements or cams are moved axially within the shaft 6. The enlargements 33 and 34, however, are arranged in such relation to the operating arms 27 of the toggle links that the second speed clutch is operated when the rod 35 is moved in one direction while the reverse speed clutch is operated when the said rod is moved in the opposite direction.

Means is provided whereby the various clutches may be operated in a predetermined sequence so that, for example, power may be transmitted through the low, second and high speed sets of gears successively and in the order enumerated. The said means includes an operating lever or handle 36 which projects through a suitable opening formed in the casing 5 to point within convenient reach of the operator of the mechanism, it being understood that the handle or lever may be suitably formed either for operation by hand or if desired for operation by the foot of the operator. The handle or lever at its lower end is mounted upon a shaft 37 carried from the wall of the casing by a bracket 38. It is formed or provided with a gear sector 39 which meshes with a gear 40. The latter is carried by a shaft 41 which also carries a second gear 42. The gear 42 meshes with a gear 43 mounted upon a shaft 44, a second gear 45 being also fixed to the said shaft. The gear 45 meshes with the teeth of a gear rack or bar 46 which is suitably supported for movement in the direction of its length by guides 48 and 48a carried by the casing 5. At its outer end, the bar 46 is connected to an arm 49 which is suitably connected to a ring 50, the latter being supported for sliding movement upon the shaft 7. The ring 50 is connected by pins 51 to the end or head 52 of the sleeve 31a, the said pins extending through slots 54 formed in the shaft. The rod 32 which carries the enlargement 30 extends beyond the head 52 of the sleeve 31a and carries at its end a disk 53 which is engaged by the end of the sleeve 31a upon movement of the enlargement 30 to a predetermined point. It will be noted that the elongated slots 54, through which the pins 51 extend, are of a length adequate to permit movement of the sleeve 31a in the manner described.

The ring 50 is connected by an arm 49a and links 58 to a disc 55 which is fixed to the countershaft 6. The said disc is connected to the operating rod 35 of the enlargements or cams 33 and 34 by pins 56, the shaft 6 being formed with opposed slots 60 in which the pins 56 slide during movement of the disc 55 axially of the said shaft. The links 58 are carried by an arcuate member 57 which fits over a portion of the disc 55 and which is adapted to permit rotation of the disc while following it in its movement axially of the shaft 6. The connection between the links 58 and the arm 49a is effected by pins 59 which extend through elongated slots 59a formed in the links, the said slots providing the lost motion connection to which reference has been made. Upon movement of the handle 36 from the position shown in the direction of the arrow, it will be apparent that during the initial movement of the bar 46 the sleeve 31a and the enlargement 31 will slide along the rod 32 which carries the enlargement 30 and will pass between the operating arms 27 of the first speed clutch and effect the engagement of the latter. The power, therefore, which is applied to the stub shaft 9 will be transmitted to the gear 14 through the gear 13 and companion clutch members 21 and 22 to the driven shaft 7. As the handle 36 is operated to move the bar 46 further in the same direction, the enlargement or cam 31 passes from between the operating arms 27 of the toggle links of the first speed clutch and the spring loaded pins 27 operate to disengage the engaged clutch members. During movement of the bar 46 to this point, the sleeve 31a has moved along the rod 32 and the arm 49a has approached the disc 55, the pins 59 moving in the slots 59a of the links 58 and thereby taking up the lost motion in the connection between the arm and the disc. The parts are so arranged that as the enlargement 31 passes from between the operating arms of the toggle links of the first speed clutch to release the latter, the arm 49a approaches and engages the member 57. Hence, as the bar 46 is moved further in the same direction the arm 49a through the agency of the member 57 carries the disc, and hence the rod 35, with it. During the initial movement of the rod 35 the enlargement 33 moves between the operating arms 27 of the toggle links of the second speed clutch and effects the engagement of the clutch members 21 and 22 of the second speed set of gears, that is to say, gears 15 and 16, and power, therefore, which is applied to the stub shaft 9 is transmitted through this set of gears to the driven shaft 7. As the bar 46 is moved further in the same direction, the enlargement 33 passes from between the operating arms 27 of the second speed clutch to permit disengagement of the latter. During movement of the bar 46 to this point, the head 52 of the sleeve 31a has been approaching the disc 53 and the parts are so designed that as the enlargement 33 passes from between the operating arms 27 of the second speed clutch to release the latter, the head 52 of the sleeve 31a approaches and engages the disc 53. Further movement, therefore, of the bar 46 is transmitted through the rod 32 to the enlargement 30 and the latter is moved between the operating arms 27 of the high speed clutch, that is to say, the clutch associated with gears 17 and 12. Power, therefore, which is applied to the stub shaft 9 is transmitted to the shaft 7 through the said high speed set of gears.

It will be apparent that by moving the operating lever 36 in a direction opposite to that indicated by the arrow the various operating cams will be returned to the neutral position shown. During their return movement the cams or enlargements engage the operating arms 27 of the various clutches and pivot them into the slots 28 and as the cams or enlargements pass beyond the arms 27, the latter are returned to their normal position by suitable springs 61. The clutches, therefore, are not engaged during the return movement of the various operating elements.

The said springs, as best shown in Figure 3, connect one end of a link 24 to a crank 62 which is carried by each pin 25 and as the said pins are connected to the operating arms 27, the springs 61 acting against the links 24 urge the arms 27 to the position shown. In this position, they extend through the slots 28 and abut the wall delimiting the ends of the slots 28.

In order to reverse the direction of the shaft 7, assuming the various parts of the mechanism are in the position shown, the operating handle 36 is moved in a direction opposite to that indicated by the arrow. This movement is transmitted through the bar 46 and links 58 against the action of a spring 46a to the disc 55 and the latter is moved along the shaft 6 in such a direction that the plunger 34 is moved between the operating arms 27 of the toggle links of the reversing clutch, that is to say the clutch which is employed in connection with the gears 18, 19 and 20. As the gear 20, therefore, is caused to rotate with the shaft 7, its movement is transmitted through the idler gear 19 to the gear 18 and the shaft 6 is rotated in a reverse direction from that described in connection with the low, second and high speed sets of gears. Upon release of the handle or lever 36, it is automatically returned to the neutral position, that is to say the position shown, the enlargement or cam 34 serving to push the operating arms 27 of the reversing clutch aside during this movement, the said arms returning to their normal position as the enlargement passes from between them.

In accordance with the invention, means is provided for connecting the bar 46 to power whereby the latter may be moved to operate automatically the various clutches in a predetermined sequence. To this end, the arm 49 carries a gear rack 63. The latter is adapted to co-operate with a gear 64 keyed to the shaft 65. The said shaft is suitably supported from a wall of the casing 5 by bearing supports 66 and in addition to the gear 64 the said shaft also carries a bevel gear 67. The latter is adapted to co-operate with a companion gear 68 fixed to a vertical shaft 69 carried from a side wall of the casing by suitable bearings 70. The shaft 69 carries at its lower end a bevel gear 71 which meshes with a bevel gear 72. The latter is fixed to a shaft 73 as is a gear 74 which meshes with a gear 75 keyed to the countershaft 6. It will be apparent, therefore, that the bevel gear 68 rotates continuously with the driving shaft 6. The gear 67, however, is normally held out of co-operating relation with the gear 68 by a spring 77a which is carried on the shaft 65 and which acts against a collar 77 carried by the said shaft and the adjacent bearing support 66. The gear 67 is moved into co-operating relation with the gear 68 against the action of the spring 77a by a lever 78 suitably supported from the casing 5. The said lever is provided with a fork extension 79 which co-operates in a conventional manner with a collar 80 carried by the shaft 65. The lever includes an extension 78a which co-operates with a suitable button 81, the latter being normally held in its operative position by a suitable spring and being available to effect movement of the gear 67 into co-operating relation with the gear 68. It will be apparent that upon depression of the button 81 the gear 67, and hence gear 64, will be rotated by the gear 68.

In order to guard against accidental operation of any of the clutches because of the accidental depression of the button 81, the gear rack 63 is held out of co-operating relation with the gear 64 when the handle 36 is in its neutral position. Hence, when it is desired to effect the automatic operation of the clutches the operating handle 36 is moved slightly in the direction necessary to effect the engagement of the low speed clutch until the rack 63 is brought into co-operating relation with the gear 64. Upon completion of this slight movement of the handle 36, the button 81 may be depressed in the manner described and the rack 63 is moved forward by power, during which movement the clutches are operated in the sequence described. As the enlargement or cam 30 moves the clutch members 21 and 22 of the high speed set of gears into co-operating relation, the trailing end of the gear rack approaches and passes beyond the gear 64, thereby preventing further movement of the clutch operating elements and maintaining the clutch members of the high speed set of gears in co-operating relation. In order to guide the gear rack 63 into and out of co-operating relation with the gear 64 the upper end of the arm 49 is mounted for sliding movement upon a guide rod 85 which is supported at one end by a wall of the casing 5 and at the opposite end by the bearing support 48a.

From the foregoing, it will be apparent that while the invention is not so limited the variable speed mechinism has advantages which render it particularly desirable as an automobile transmission. Power from the engine may be transmitted to the drive shaft through the various sets of gears which are selected in a predetermined sequence as the operating handle is moved continuously in a single direction, the handle, as illustrated, being moved in the direction that the automobile is to move. It will also be noted that the engine may be disconnected from the drive shaft regardless of the clutch which may be engaged at the particular time by a slight movement of the operating handle 36, thereby providing an arrangement suitable for free wheeling.

We claim as our invention:

1. A clutch operating mechanism for a variable speed gearing having a drive shaft, a countershaft, gears of different diameters carried by said countershaft, one of said gears being fixed to said countershaft, a hollow driven shaft, gears of different diameters carried by said driven shaft and in mesh with the gears carried by said countershaft, one of said last-mentioned gears being loosely mounted on said driven shaft and in mesh with said gear which is fixed to said countershaft, said mechanism comprising a clutch member carried by said loosely mounted gear, a co-operating clutch member carried by said driven shaft and means for moving said co-operating clutch member along said driven shaft into engagement with said first mentioned clutch member, said means including toggle links, an element for operating said links which projects into said driven shaft and a member movable in said driven shaft into and out of co-operating relation with said element.

2. A clutch operating mechanism for a variable speed gearing having a drive shaft, a hollow countershaft, gears of different diameters carried by said countershaft, one of said gears being loosely mounted on said countershaft, a driven shaft, gears of different diameters carried by said driven shaft and in mesh with the gears carried by said countershaft, one of said gears being fixed to said driven shaft and in mesh with said gear loosely mounted on said countershaft, said mechanism comprising a clutch member carried by said loosely mounted gear, a co-operating clutch member carried by said countershaft and means for moving said co-operating clutch member into engagement with the clutch member first mentioned, said means including toggle links which engage said co-operating clutch member to move the latter along said shaft, an element for operating said links which projects into said countershaft and a member in said shaft movable into and out of co-operating relation with said element.

3. A clutch operating mechanism for a variable speed gearing having a drive shaft, a countershaft, gears of different diameters carried by said countershaft, one of said gears being fixed to said countershaft, a hollow driven shaft, gears of different diameters carried by said driven shaft and in mesh with the gears carried by said countershaft, one of said gears being loosely mounted on said driven shaft and in mesh with said gear which is fixed to said countershaft, said mechanism comprising a clutch member carried by said loosely mounted gear, a co-operating clutch member carried by said driven shaft and means for moving said co-operating clutch member along said driven shaft into engagement with said first mentioned clutch member, said means including toggle links, an element for operating said links which projects into said driven shaft and a member having an enlargement which is movable against said element to effect the engagement of said clutch members and movable beyond said element to permit the release of said clutch members, said element being free to move out of the path of said enlargement in the return movement of said member so as to prevent reengagement of said clutch members.

4. A clutch operating mechanism for a variable speed gearing having a drive shaft, a hollow countershaft, gears of different diameters carried by said countershaft, one of said gears being loosely mounted on said countershaft, a driven shaft, gears of different diameters carried by said griven shaft and in mesh with the gears carried by said countershaft, one of said gears being fixed to said driven shaft and in mesh with said gear loosely mounted on said countershaft, said mechanism comprising a clutch member carried by said loosely mounted gear, a co-operating clutch member carried by said countershaft and means for moving said clutch members into co-operating relation, said means including toggle links which engage said co-operating clutch member and which are adapted to move the latter along said countershaft, an element for operating said links which project into said shaft and a movable member having an enlargement which, when moved against said element, is adapted to effect the engagement of said clutch members and which is movable beyond said element to permit the release of said clutch members, said element being free to move out of the path of said enlargement during the return movement of said member so as to prevent the re-engagement of said clutch members.

5. A clutch operating mechanism for a variable speed gearing having a drive shaft, a hollow countershaft, gears of different diameters carried by said countershaft, one of said gears being fixed to said countershaft and another of said gears being loosely mounted on said countershaft, a hollow driven shaft, gears of different diameters carried by said driven shaft and in mesh with the gears carried by said countershaft, one of said gears being loosely mounted on said driven shaft and in mesh with said gear which is fixed to said countershaft and another of said gears being fixed to said driven shaft and in mesh with said gear which is loosely mounted on said countershaft, said mechanism comprising a clutch member carried by each of said loosely mounted gears, companion clutch members for co-operating with said clutch members first mentioned, toggle links for effecting the operation of said companion clutch members, an element for operating each of said toggle links, said elements projecting into said hollow shafts and means in said shafts for co-operating with said elements to selectively operate said clutch members.

6. A clutch operating mechanism for a variable speed gearing having a drive shaft, a hollow countershaft, gears of different diameters carried by said countershaft, one of said gears being fixed to said countershaft and another of said gears being loosely mounted on said countershaft, a hollow driven shaft, gears of different diameters carried by said driven shaft and in mesh with the gears carried by said countershaft, one of said gears being loosely mounted on said driven shaft and in mesh with said gear which is fixed to said countershaft and another of said gears being fixed to said driven shaft and in mesh with said gear which is loosely mounted on said countershaft, said mechanism comprising a clutch member carried by each of said loosely mounted gears, companion clutch members, toggle links for moving said companion clutch members into co-operation with said clutch members first mentioned, an element for operating each of said toggle links, said elements projecting into said hollow shafts, movable members in said shafts provided with enlargements which when moved into engagement with said elements are adapted to operate said companion clutch members and means co-operating with said movable members for selectively operating said companion clutch members, an enlargement of one of said movable members being adapted while being moved in a single direction to first operate one of said elements and effect the engagement of one of said companion clutch members with its co-operating clutch member and then to effect the release of said engaged clutch member, said element being free to move out of the path of said enlargement during the return movement of said member so as to prevent the re-engagement of said companion clutch member.

7. A clutch operating mechanism for a variable speed gearing having a drive shaft, a hollow countershaft, gears of different diameters carried by said countershaft, a hollow driven shaft, a plurality of gears of different diameters carried by said driven shaft and in mesh with the gears carried by said countershaft, thereby providing a plurality of sets of gears through which power may be transmitted from said countershaft to said driven shaft to rotate the latter in the same direction, one gear in each set being fixed to its shaft and the other gear of the set being loosely mounted upon its shaft, said mechanism comprising a clutch associated with each of said loosely mounted gears, toggle links for engaging said clutches, elements connected to said toggle links and projecting into said hollow shafts, for operating said clutches, members in said shafts which are movable therein into and out of co-operation with said operating elements and means for effecting the operation of said clutches in a predetermined sequence, said means including a control lever operatively connected to said movable members.

8. A clutch operating mechanism for a variable speed gearing having a drive shaft, a hollow countershaft, gears of different diameters carried by said countershaft, a hollow driven shaft, a plurality of gears of different diameters carried by said driven shaft and in mesh with the gears carried by said countershaft, thereby providing a plurality of sets of gears through which power may be transmitted from said countershaft to said driven shaft to rotate the latter at different speeds in the same direction, one gear of each set being fixed to its shaft and the other gear of the set being loosely mounted upon its shaft, said mechanism comprising a clutch associated with each of said loosely mounted gears, toggle links for effecting the engagement of said clutches, operating elements connected to said toggle links and projecting into said hollow shafts, members in said shafts which are movable therein into and out of co-operation with said operating elements and means for effecting the operation of said clutches in a predetermined sequence, said means including a control lever operatively connected to the movable members in said shafts and adapted to effect the operation of the clutches in the manner described as it is moved in a single direction.

HYMEN A. BLANCHARD.
CHARLES W. ROBERTSON.